United States Patent
Miyano

(10) Patent No.: US 6,490,096 B2
(45) Date of Patent: Dec. 3, 2002

(54) ACHROMATIC LENS AND ZOOM LENS USING THE SAME

(75) Inventor: Hitoshi Miyano, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/772,881

(22) Filed: Jan. 31, 2001

(65) Prior Publication Data

US 2001/0019455 A1 Sep. 6, 2001

(30) Foreign Application Priority Data

Feb. 16, 2000  (JP) ...................................... 2000-037881

(51) Int. Cl.[7] .............................................. G02B 15/14
(52) U.S. Cl. ........................ 359/684; 359/685; 359/688; 359/689; 359/786
(58) Field of Search ............................... 359/684, 685, 359/688, 689, 786

(56) References Cited

U.S. PATENT DOCUMENTS

| | | | | |
|---|---|---|---|---|
| 4,634,237 A | * | 1/1987 | Aono et al. ................. | 359/688 |
| 4,765,722 A | * | 8/1988 | Aono .......................... | 359/685 |
| 5,579,172 A | * | 11/1996 | Aoki et al. .................. | 359/688 |
| 5,978,150 A | * | 11/1999 | Hamanishi et al. ......... | 359/683 |
| 5,995,297 A | * | 11/1999 | Usui ........................... | 359/569 |
| 6,002,528 A | * | 12/1999 | Tomita ........................ | 359/684 |
| 6,084,721 A | * | 7/2000 | Terasawa ..................... | 359/684 |

* cited by examiner

*Primary Examiner*—Evelyn A Lester
(74) *Attorney, Agent, or Firm*—Snider & Associates; Ronald R. Snider

(57) ABSTRACT

In a zoom lens comprising first to fourth lens groups, the second lens group comprises two meniscus lenses and an achromatic lens. The achromatic lens comprises a cemented lens having a negative refracting power as a whole, and a lens having a positive refracting power with a convex surface directed onto the object side. The cemented lens comprises a meniscus lens or plane-convex lens having a positive refracting power with a concave surface or plane directed onto the object side, and a lens having a negative refracting power.

5 Claims, 13 Drawing Sheets

EXAMPLE 1

EXAMPLE 1
2ND LENS GROUP G2 ENLARGED VIEW

EXAMPLE 2

EXAMPLE 2
2ND LENS GROUP G2 ENLARGED VIEW

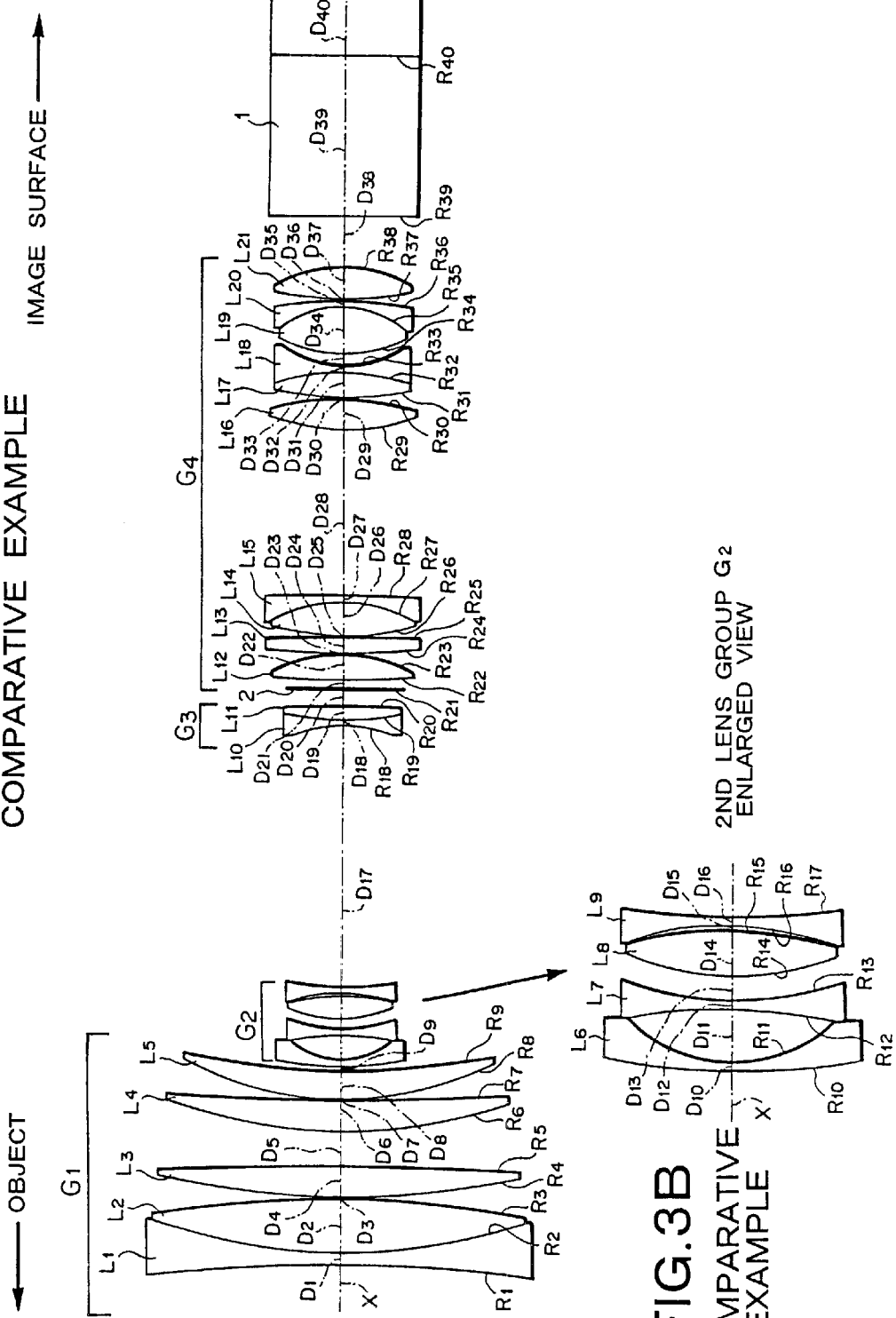
FIG.3A COMPARATIVE EXAMPLE
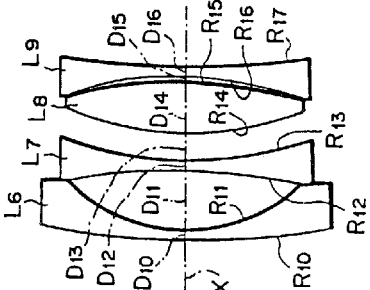
FIG.3B COMPARATIVE EXAMPLE
2ND LENS GROUP G2 ENLARGED VIEW

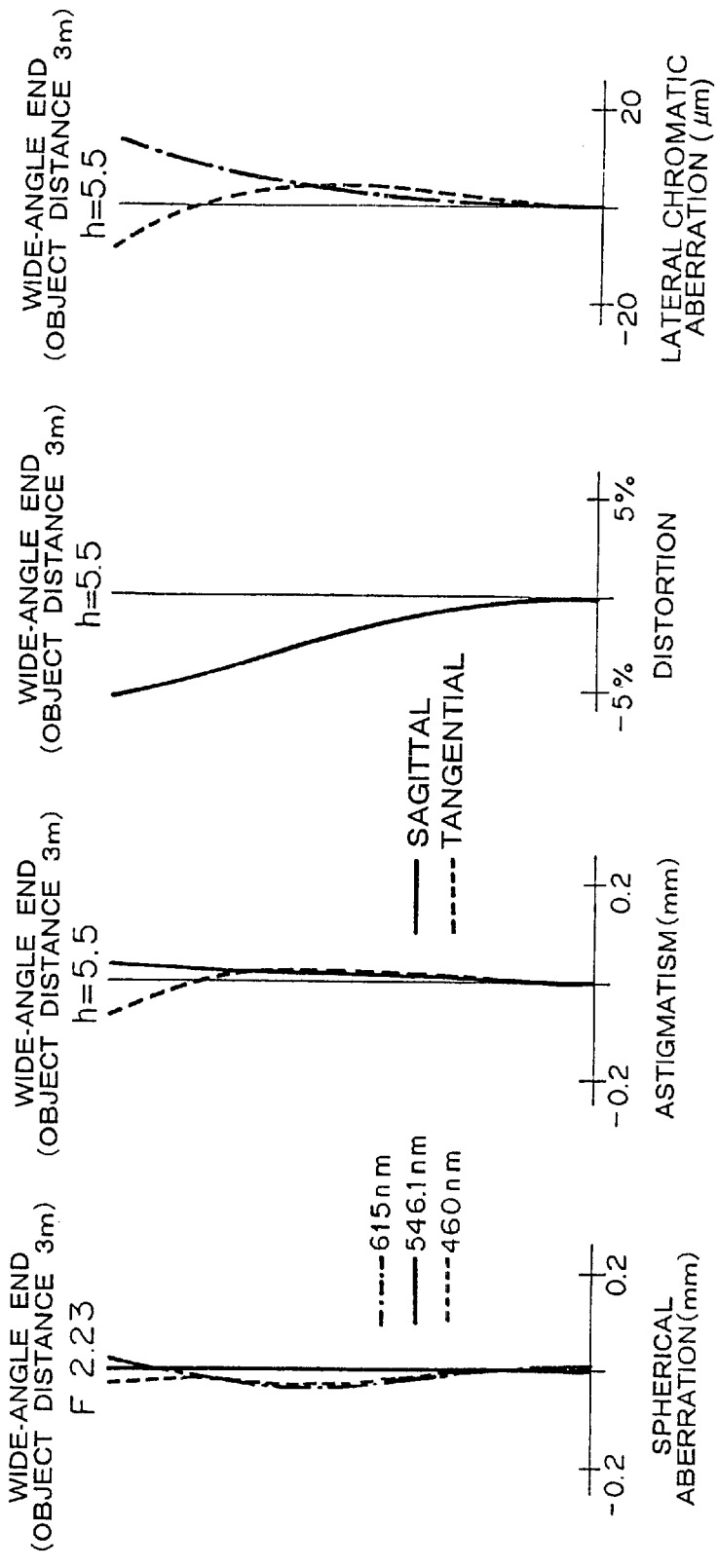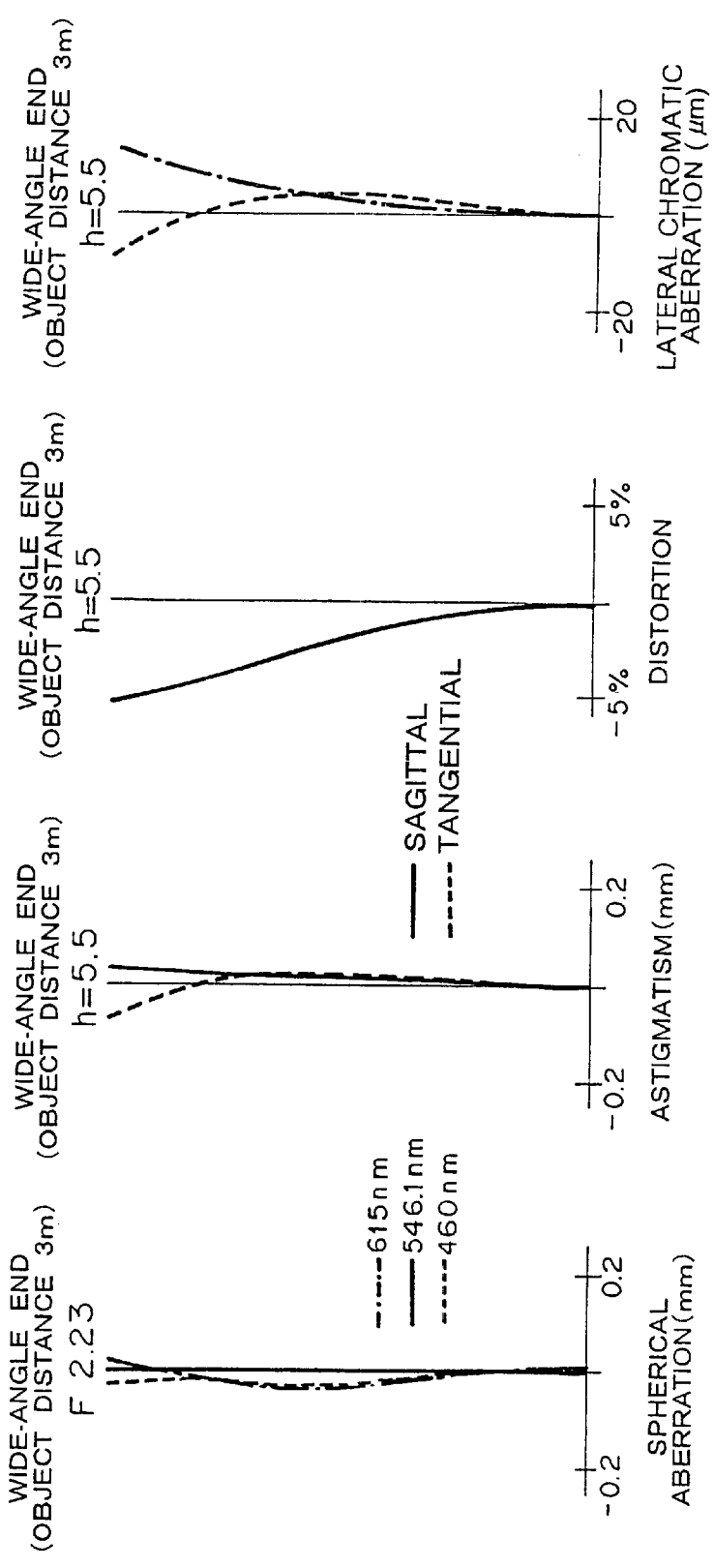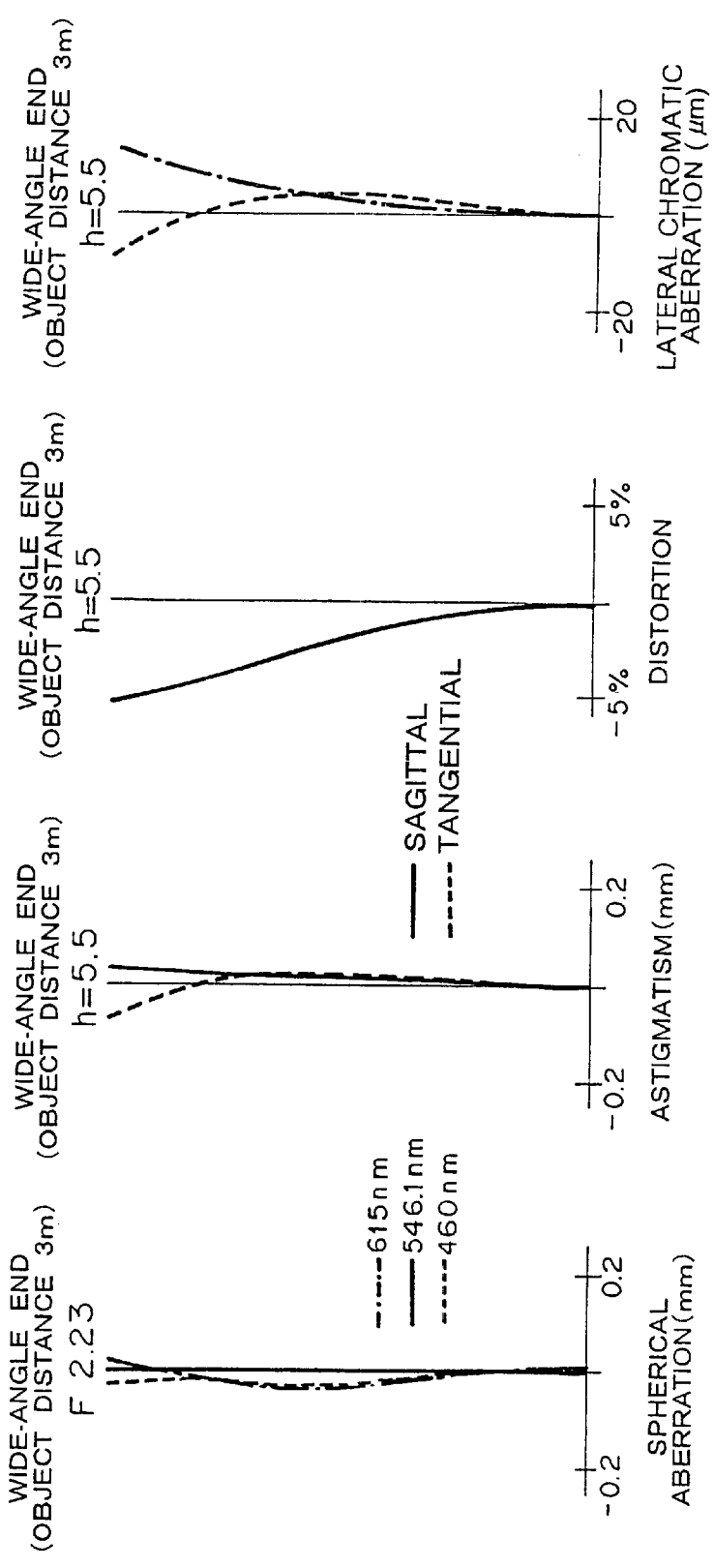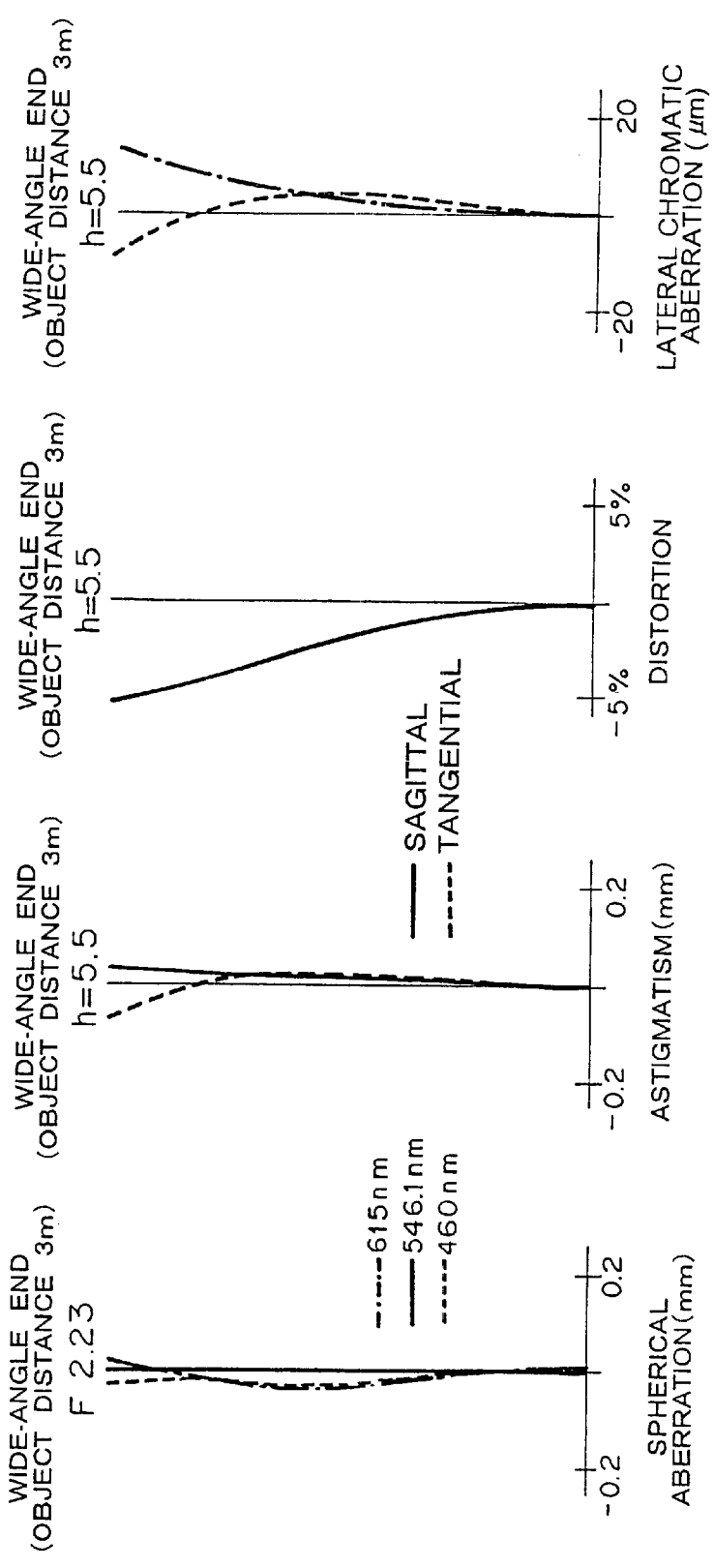

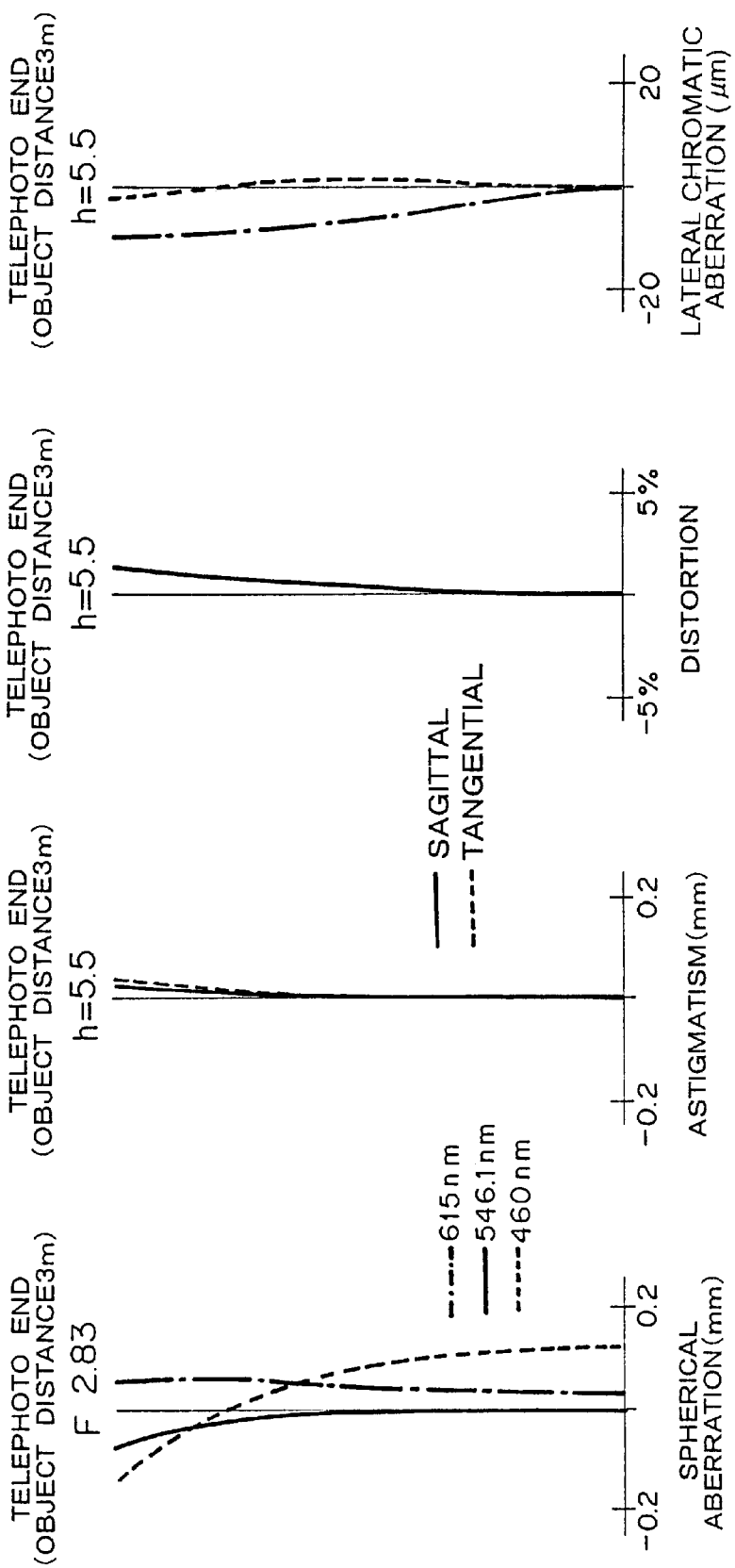

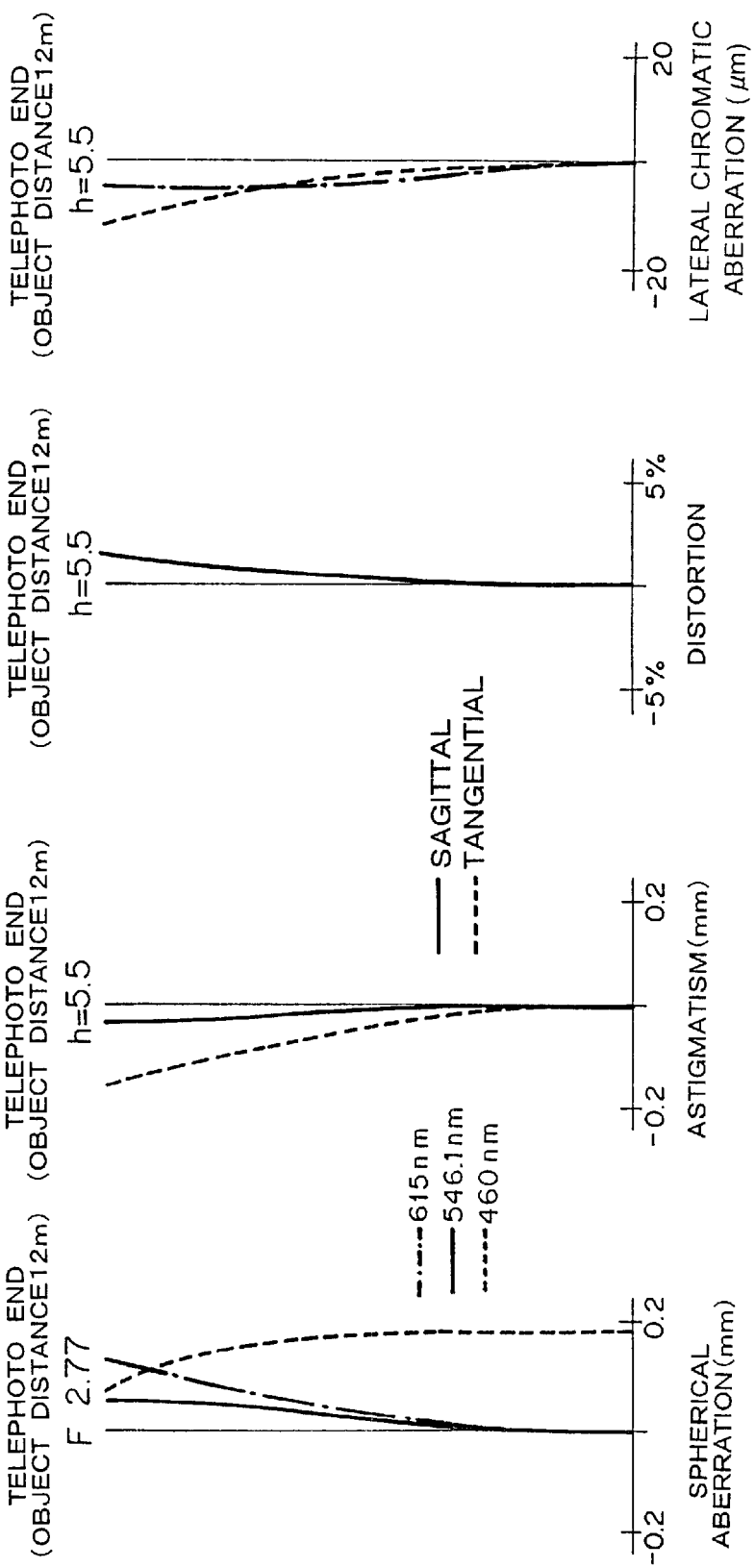

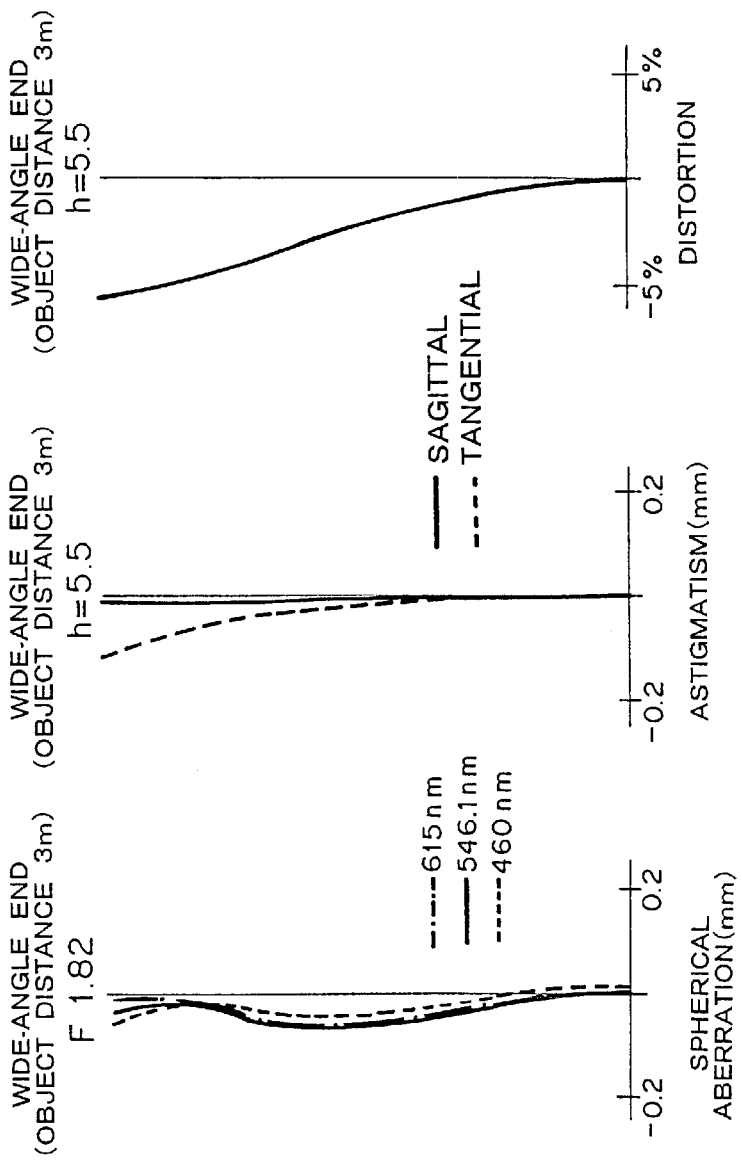
FIG.7A EXAMPLE 2
FIG.7B EXAMPLE 2
FIG.7C EXAMPLE 2
FIG.7D EXAMPLE 2

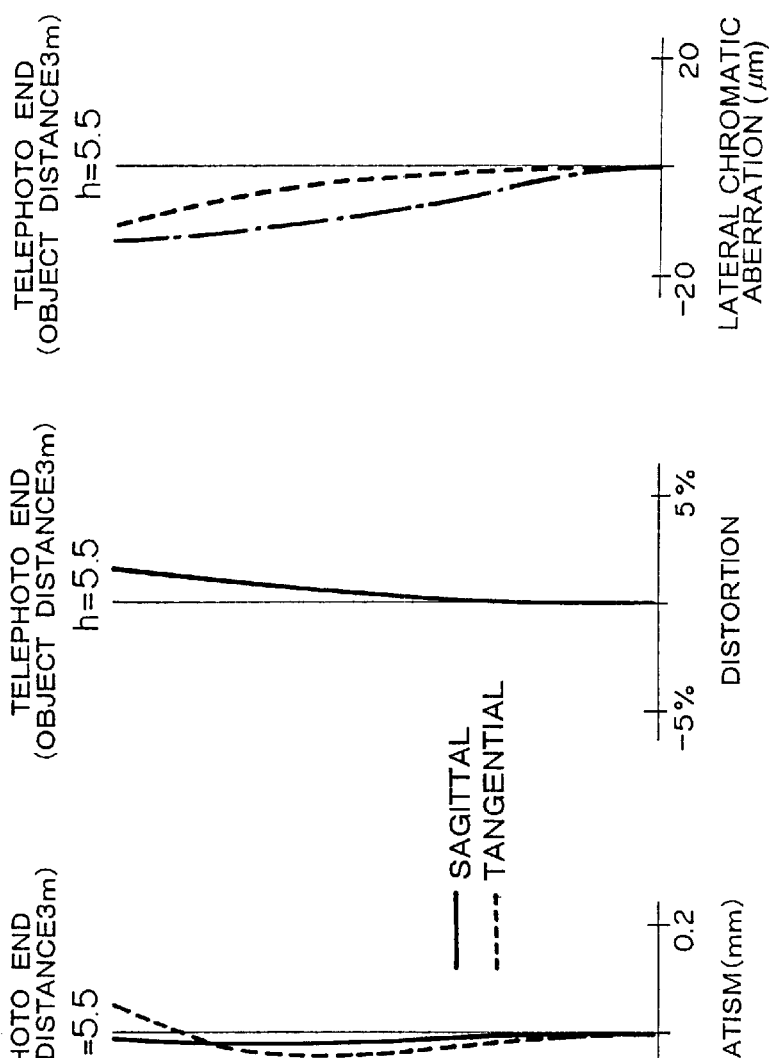

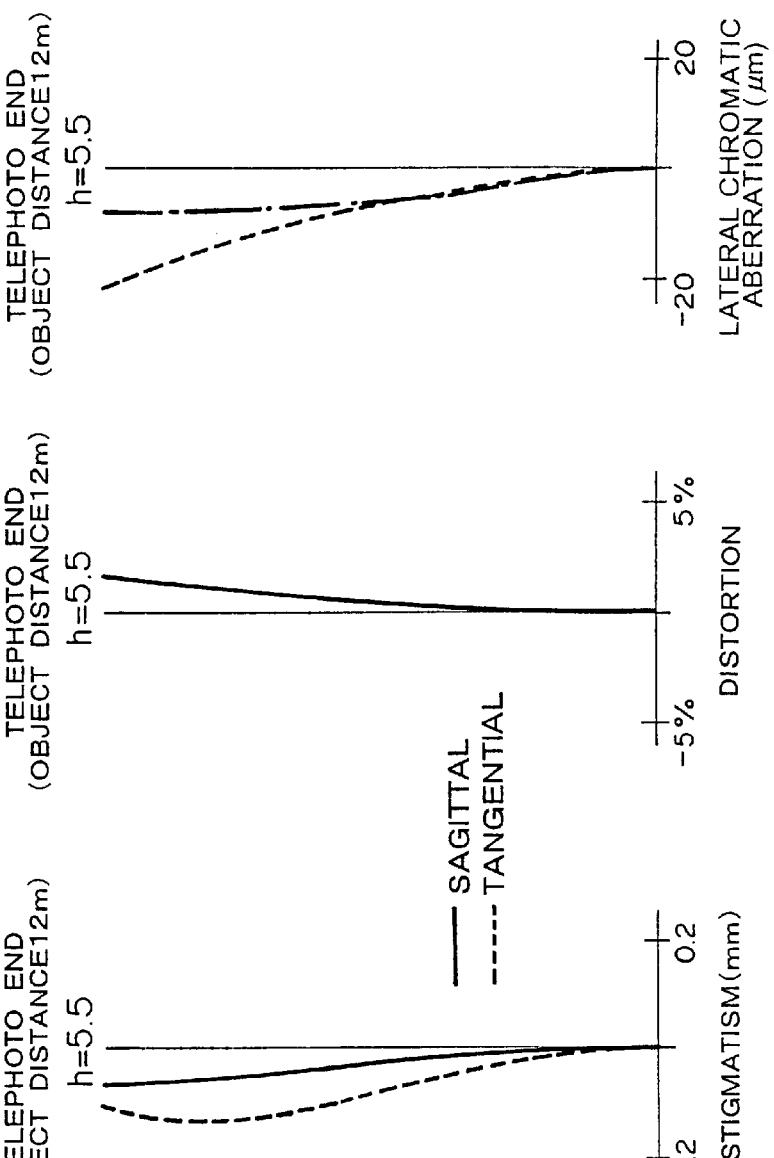

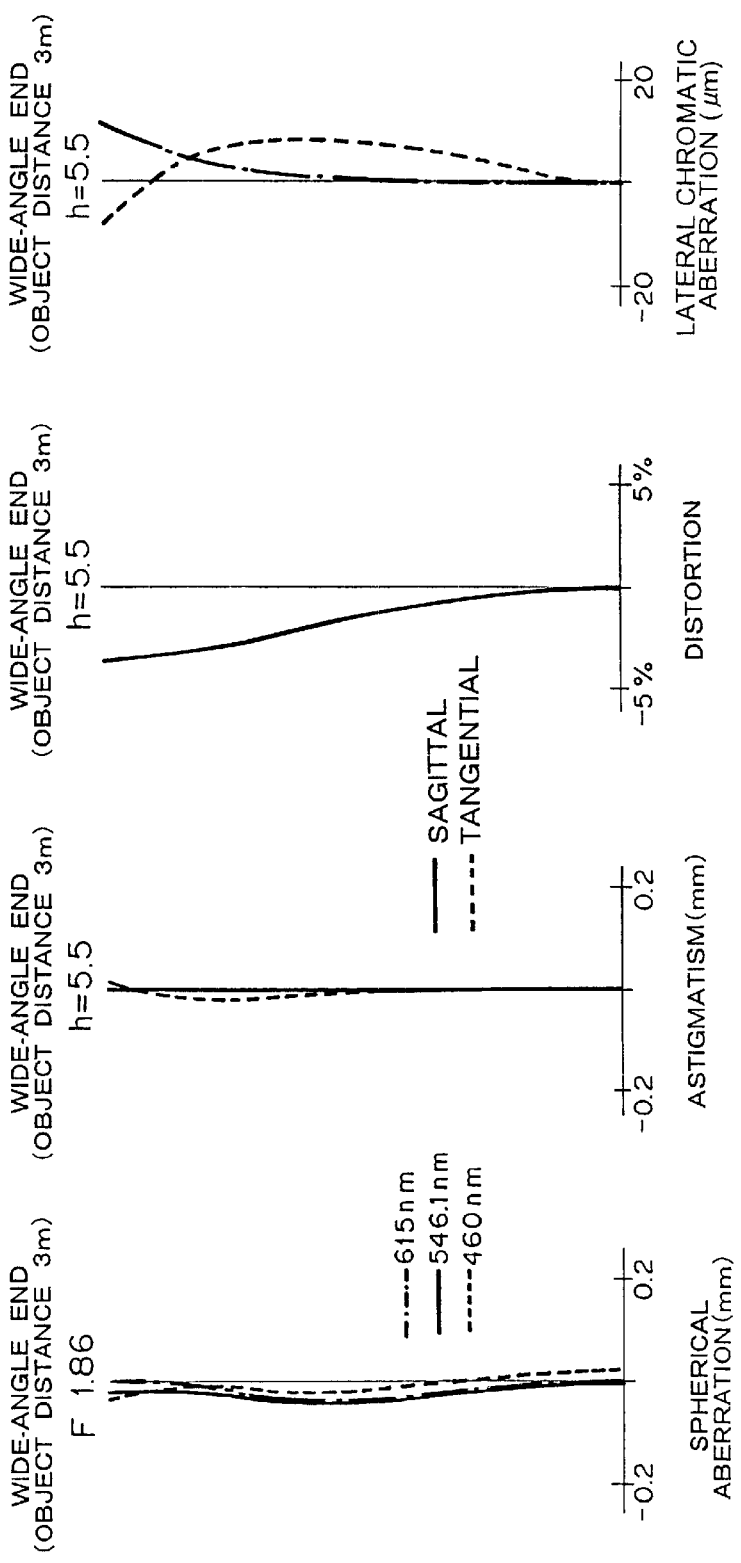

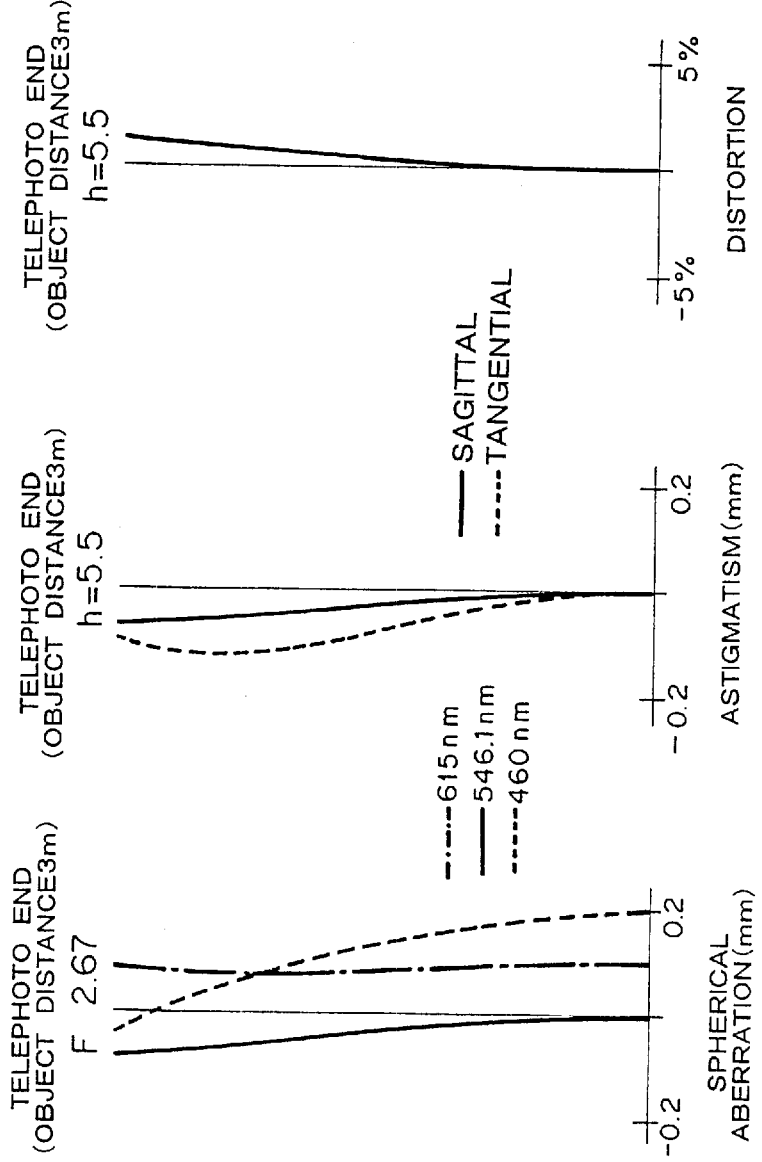

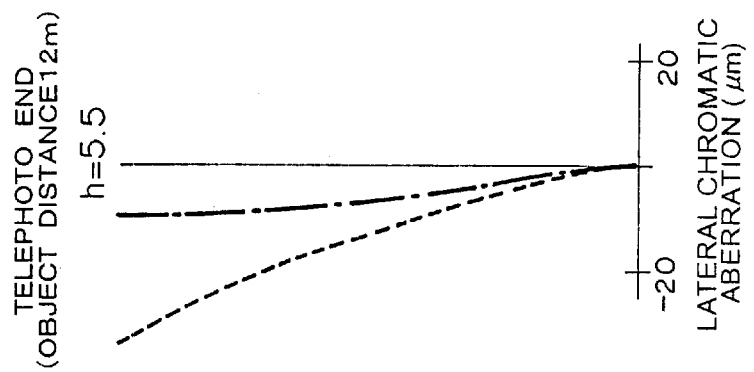
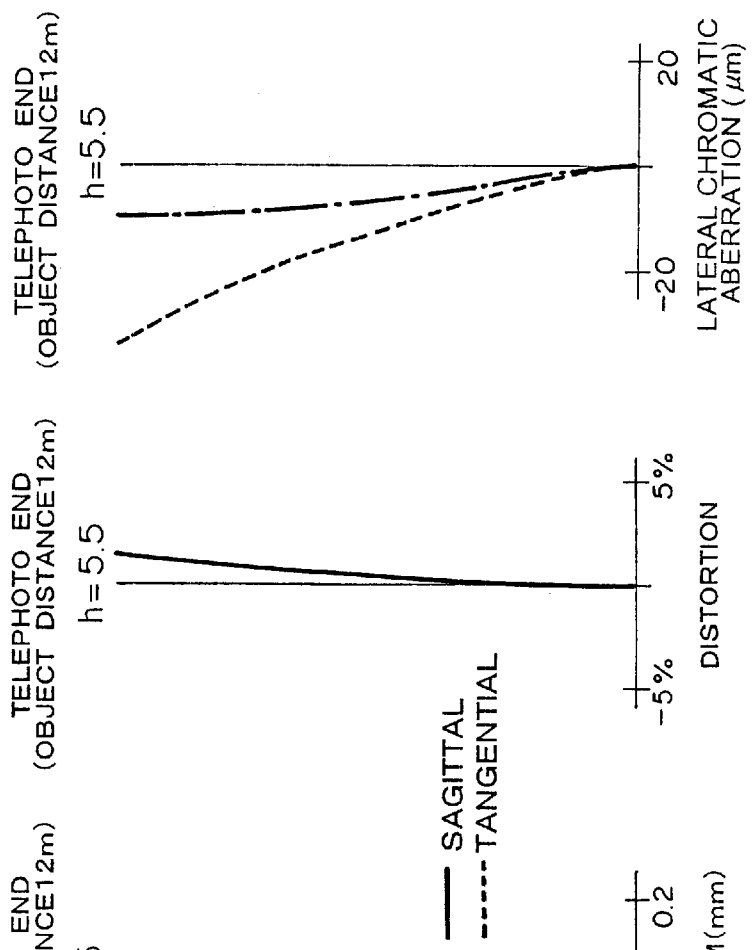
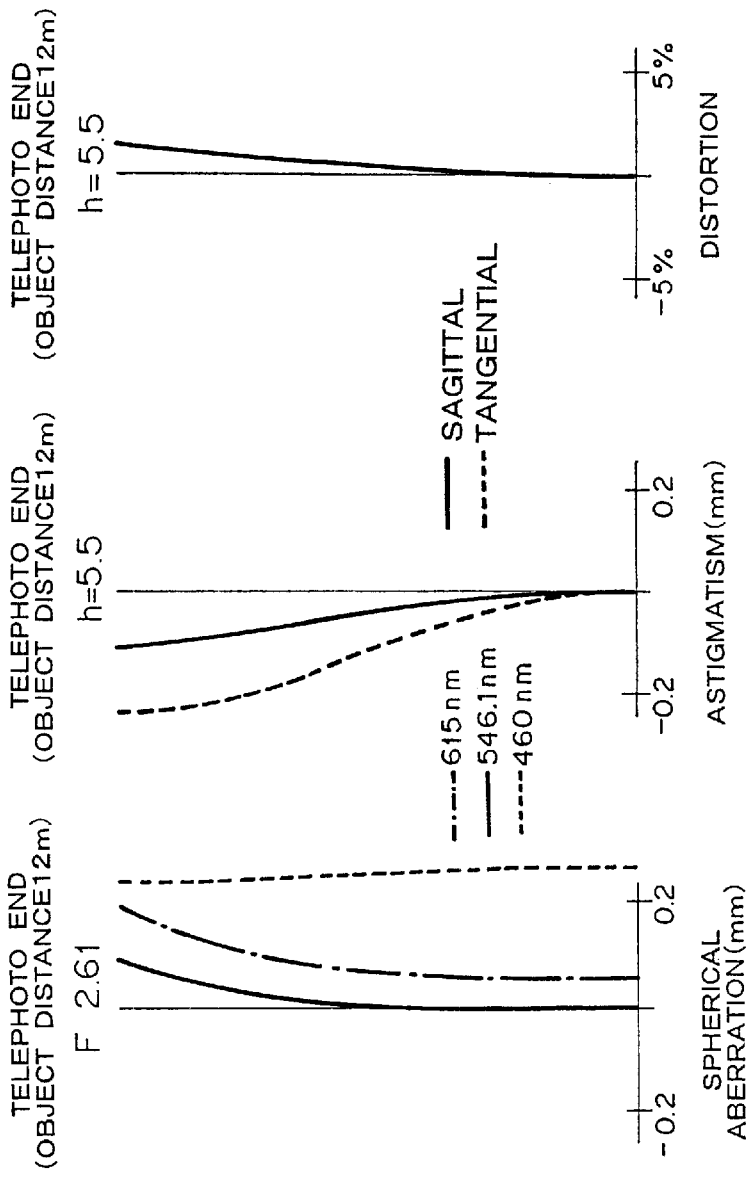

ACHROMATIC LENS AND ZOOM LENS USING THE SAME

RELATED APPLICATIONS

This application claims the priority of Japanese Patent Application No. 2000-037881 filed on Feb. 16, 2000, which is incorporated herein by reference.

BACKGROUND OF THE INVENTION

1. Field of the Invention

The present invention relates to a high-ratio zoom lens mountable to a handy-type TV camera; and, in particular, to a zoom lens using a three-element achromatic lens as a variator.

2. Description of the Prior Art

In recent years, four-group type zoom lenses having a high power variation have come into use as being mounted to handy-type TV cameras.

For making the TV cameras smaller, demands for reducing the size of such four-group type zoom lenses have been increasing year by year. If those having a high power variation are to be made smaller, then their various kinds of aberration become greater, against which measures are necessary.

Among them, it is not always easy to correct chromatic aberration occurring upon zooming or focusing, such as lateral chromatic aberration in particular. For correcting such chromatic aberration, so-called counter achromatization technique has been known, in which, when the variator has a negative refracting power, the dispersion of a positive lens among lenses constituting the variator is made greater, whereas the dispersion of a negative lens among these lenses is made smaller. A cemented lens of such a combination may be used so as to correct the lateral chromatic aberration.

As the achromatic lens, those comprising three elements such as one shown in FIG. 14 in which another lens is combined with the cemented lens in order to increase the number of lens surfaces in view of the freedom of design have conventionally been known.

When such a three-element achromatic lens is used, however, the total length of lens system further increases, which contradicts the demand for compactness. This point will now be explained specifically with reference to FIG. 13.

FIG. 13 schematically shows a principal ray of a luminous flux corresponding to a marginal portion of a picture when a second lens group, which is a variator contributing to power variation, is positioned at a wide-angle end (closest to the object). The solid line and dotted line indicate the principal ray in the case where the achromatic lens of the second lens group is constituted by two elements and by three elements, respectively. Here, "2" is a stop, which is configured such that a third lens group $G_3$, i.e., a compensator, is positioned upstream thereof. According to FIG. 13, the lens thickness in the case of a second lens group $G'_2$ whose achromatic lens is constituted by three elements becomes greater than that in a second lens group $G_2$ whose achromatic lens is constituted by two elements, whereby the lens diameter of a first lens group $G'_1$ positioned upstream the second lens group $G'_2$ becomes greater than that of a first lens group $G_1$ positioned upstream the second lens group $G_2$.

SUMMARY OF THE INVENTION

In view of such circumstances, it is an object of the present invention to provide an achromatic lens exhibiting a counter achromatization effect, which can satisfy the demand for compactness while fully securing the freedom of design by increasing the number of lens surfaces; and a zoom lens using the same.

The zoom lens in accordance with the present invention comprises, successively from an object side, a first lens group, fixed upon zooming, having a positive refracting power; a second lens group, movable upon zooming, having a negative refracting power; a third lens group, having a negative refracting power, for correcting a fluctuation of an image surface upon zooming; and a fourth lens group, fixed upon zooming, having a positive refracting power;

wherein the second lens group comprises, successively from the object side, two meniscus lenses each having a negative refracting power with a convex surface directed onto the object side; and An achromatic lens comprising, successively from the object side, a cemented lens having a negative refracting power as a whole, and a lens having a positive refracting power with a convex surface directed onto the object side; the cemented lens comprising, successively from the object side, a meniscus lens or plane-convex lens having a positive refracting power with a concave surface or plane directed onto the object side, and a lens having a negative refracting power.

Preferably, the first lens group comprises, successively from the object side, a first-a lens group, fixed upon a focusing operation, having a positive refracting power; and a first-b lens group, movable to the object side upon a focusing operation from an object at infinity into an object at a shorter distance, having a positive refracting power.

Preferably, the zoom lens of the present invention satisfies both of the following conditional expressions (1) and (2):

$$\nu_{23} < 25.0 \tag{1}$$

$$\nu_{25} < 25.0 \tag{2}$$

where $\nu_{23}$ is the Abbe number $\nu_d$ of the lens having a positive refracting power constituting the cemented lens in the second lens group; and $\nu_{25}$ is the Abbe number $\nu_d$ of the lens having a positive refracting power with a convex surface directed onto the object side constituting the cemented lens in the second lens group.

Preferably, the zoom lens of the present invention satisfies the following conditional expression (3):

$$0.30 < f_2/f_{2a} < 0.60 \tag{3}$$

where $f_2$ is the focal length of the second lens group; and $f_{2a}$ is the focal length of the cemented lens in the second lens group.

Preferably, the zoom lens of the present invention satisfies the following conditional expression (4):

$$|N_{23} - N_{24}| < 0.02 \tag{4}$$

where $N_{23}$ is the refractive index $N_e$ of the lens having a positive refracting power constituting the cemented lens in the second lens group; and $N_{24}$ is the refractive index $N_e$ of the lens having a negative refracting power constituting the cemented lens in the second lens group.

The achromatic lens in accordance with the present invention comprises, successively from the object side, a cemented lens having a negative refracting power as a whole, and a lens having a positive refracting power with a convex surface directed onto the object side; the cemented lens comprising, successively from the object side, a meniscus lens or a plane-convex lens having a positive refracting power with a concave surface or plane directed onto the object side, and a lens having a negative refracting power.

In this case, a lens group including the achromatic lens may be movable upon zooming.

BRIEF DESCRIPTION OF THE DRAWINGS

FIGS. 3A and 3B are schematic views showing a basic configuration of the zoom lens in accordance with Comparative Example;

FIGS. 4A to 4D are aberration charts of the zoom lens in accordance with Example 1 at its wide-angle end (object distance: 3 m; f=8.5 mm);

FIGS. 5A to 5D are aberration charts of the zoom lens in accordance with Example 1 at its telephoto end (object distance: 3 m; f=170 mm);

FIGS. 6A to 6D are aberration charts of the zoom lens in accordance with Example 1 at its telephoto end (object distance: 12 m; f=170 mm);

FIGS. 7A to 7D are aberration charts of the zoom lens in accordance with Example 2 at its wide-angle end (object distance: 3 m; f=8.0 mm);

FIGS. 8A to 8D are aberration charts of the zoom lens in accordance with Example 2 at its telephoto end (object distance: 3 m; f=128 mm);

FIGS. 9A to 9D are aberration charts of the zoom lens in accordance with Example 2 at its telephoto end (object distance: 12 m; f=128 mm);

FIGS. 10A to 10D are aberration charts of the zoom lens in accordance with Comparative Example at its wide-angle end (object distance: 3 m; f=9.0 mm);

FIGS. 11A to 11D are aberration charts of the zoom lens in accordance with Comparative Example at its telephoto end (object distance: 3 m; f=162 mm);

FIGS. 12A to 12D are aberration charts of the zoom lens in accordance with Comparative Example at its telephoto end (object distance: 12 m; f=162 mm);

DESCRIPTION OF THE PREFERRED EMBODIMENTS

In the following, embodiments of the zoom lens in accordance with the present invention will be explained with reference to drawings.

Example 1

Figures 1A, 1B:
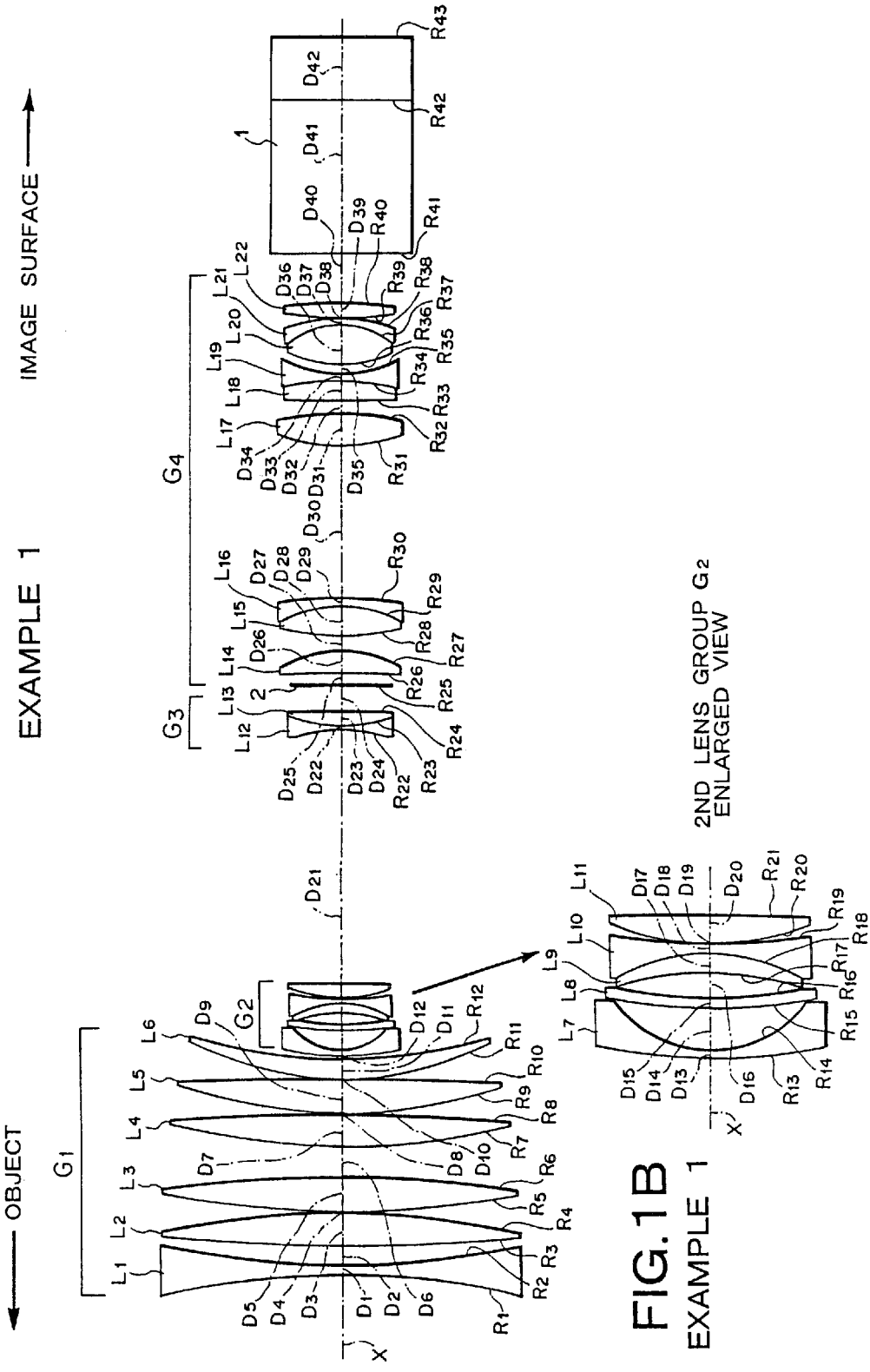
FIGS. 1A and 1B are schematic views showing a basic configuration of the zoom lens in accordance with Example 1 of the present invention.

FIGS. 1A and 1B show the zoom lens in accordance with Example 1 of the present invention, illustrating the individual lens configurations at its wide-angle end.

As shown in FIG. 1A, the zoom lens of Example 1 comprises, successively from the object side, a first lens group $G_1$, fixed upon zooming, having a negative refracting power; a second lens group $G_2$, movable upon zooming, having a negative refracting power; a third lens group $G_3$, movable upon zooming, having a negative refracting power; and a fourth lens group $G_4$, fixed upon zooming, having a positive refracting power; in which the second lens group $G_2$ is moved in the direction of optical axis X so as to change the focal length of the whole system, and the fourth lens group $G_4$ is moved in the direction of optical axis X so as to correct the fluctuation of image-forming position.

The first lens group $G_1$ is constituted by six lenses $L_1$ to $L_6$; the second lens group $G_2$ is constituted by five lenses $L_7$ to $L_{11}$; the third lens group $G_3$ is constituted by two lenses $L_{12}$ and $L_{13}$; and the fourth lens group $G_4$ is constituted by a stop 2 and nine lenses $L_{14}$ to $L_{22}$.

FIG. 1B shows the configuration of the second lens group $G_2$, which is a characteristic feature of the lens in accordance with the present invention, in enlarged dimension. Namely, the second lens group $G_2$ comprises, successively from the object side, two negative meniscus lenses $L_7$, $L_8$ each having a convex surface directed onto the object side; a positive meniscus lens $L_9$ having a concave surface directed onto the object side; a biconcave lens $L_{10}$ having a surface with a stronger curvature directed onto the object side; and a positive meniscus lens $L_{11}$ having a convex surface directed onto the object side. The positive meniscus lens $L_9$ and the biconcave lens $L_{10}$ form a cemented lens. The cemented lens and the positive refractive lens $L_{11}$ constitute an achromatic lens (for counter achromatization).

The first lens group $G_1$ is constituted by a first-a lens group $G_{1a}$ ($L_1$ to $L_3$), fixed upon a focusing operation, having a positive refracting power; and a first-b lens group $G_{1b}$ ($L_4$ to $L_6$), movable to the object side upon a focusing operation from an object at infinity into an object at a shorter distance, having a positive refracting power.

Also, the zoom lens is configured so as to satisfy the following conditional expressions (1) to (4):

$$\nu_{23} < 25.0 \tag{1}$$

$$\nu_{25} < 25.0 \tag{2}$$

$$0.30 < f_2/f_{2a} < 0.60 \tag{3}$$

$$|N_{23} - N_{24}| < 0.02 \tag{4}$$

where $\nu_{23}$ is the Abbe number $\nu_d$ of the positive lens $L_9$ constituting the cemented lens in the second lens group $G_2$; and $\nu_{25}$ is the Abbe number $\nu_d$ of the positive lens $L_{11}$ in the second lens group $G_2$;

$f_2$ is the focal length of the second lens group $G_2$;

$f_{2a}$ is the focal length of the cemented lens in the second lens group $G_2$;

$N_{23}$ is the refractive index $N_e$ of the positive lens $L_9$ constituting the cemented lens in the second lens group $G_2$; and $N_{24}$ is the refractive index $N_e$ of the negative lens $L_{10}$ constituting the cemented lens in the second lens group $G_2$.

The stop 2 is disposed closest to the object in the fourth lens group $G_4$ as mentioned above, whereas a color-decomposing prism 1 is disposed downstream the fourth lens group $G_4$. The luminous flux incident along the optical axis X from the object side forms an image at an imaging surface (not depicted) such as a solid-state imaging device or the like and is split by the prism 1 so as to be guided to a finder or the like.

Technical meanings of the above-mentioned conditional expressions (1) to (4) will now be explained.

The above-mentioned conditional expression (1) defines the Abbe number $v_d$ of the glass material of the positive lens constituting the cemented lens of the second lens group. Outside of this range, the radius of curvature of the cemented surface has to be made smaller in order to favorably correct lateral chromatic aberration, whereby the thickness of cemented lens increases.

The above-mentioned conditional expression (2) defines the Abbe number $v_d$ of the glass material of the positive lens having a positive refracting power with a convex surface directed onto the object side in the second lens group. Outside this range, lateral chromatic aberration is hard to correct favorably.

The above-mentioned conditional expression (3) defines the ratio of refracting power of cemented lens to the refracting power of the second lens group as a whole. Below its lower limit, the refracting power of the cemented lens becomes too weak, whereas the refracting power of the two negative meniscus lenses becomes too strong, whereby various kinds of aberration are hard to correct. In particular, the radius of curvature of the object-side surface of the negative lens closest to the object in the second lens group becomes too large, so that negative distortion occurs at the wide-angle end. Beyond its upper limit, by contrast, the radius of curvature of the concave surface of the positive lens constituting the cemented lens becomes smaller, so that the radius of curvature of the object-side surface of the negative lens closest to the object in the second lens group becomes smaller in order to correct aberration, which increases the thickness of the object-side negative lens. As a result, the total length of the second lens group acting as a variator increases, thereby contradicting the demand for compactness.

The above-mentioned conditional expression (4) defines the difference in refractive index $N_e$ between the positive lens and negative lens constituting the cemented lens in the second lens group. In general, color bleeding under the influence of axial chromatic aberration at the telephoto end cannot be neglected when zoom ratio increases. When designing a lens, however, it is hard to uniquely determine to which extent images should be converged at a wavelength other than the design reference wavelength. If green is taken as a reference wavelength in the case of three colors of green, blue, and red, for example, then it is difficult to uniquely determine appropriate amounts of axial chromatic aberration for blue and red. It is unrealistic to design a lens system comprising a plurality of lenses generating respective amounts of axial chromatic aberration different from each other and then choose an optimal one therefrom. Hence, the refractive index difference of the cemented lens in the second lens group is set to a predetermined value or lower according to the above-mentioned conditional expression (4), whereby the cemented lens can be replaced alone without changing the design of the whole lens system. As a consequence, even when the actually manufactured lens system does not yield a desirable axial chromatic aberration value, the cemented lens greatly affecting the axial chromatic aberration value can be replaced, whereby the axial chromatic aberration value can easily be ameliorated to a desirable value.

Table 1 (follows) shows the values of radius of curvature R (mm) of each lens surface, center thickness of each lens and air space between each pair of neighboring lenses (hereinafter collectively referred to as axial surface space) D (mm), refractive index N of each lens at e-line, and Abbe number $v$ of each lens at d-line in the zoom lens in accordance with Example 1. The numbers in the table successively increase from the object side.

The lower part of Table 1 shows the focal length f of the whole system from its wide-angle end to telephoto end, and F number. Further, it shows the zoom ratio.

As shown in the lower part of Table 1, the value of $v_{23}$ in the above-mentioned conditional expression (1) is 22.8, the value of $v_{25}$ in the above-mentioned conditional expression (2) is 23.9, the value of $f_2/f_{2a}$ in the above-mentioned conditional expression (3) is 0.521, and the value of $|N_{23}-N_{24}|$ in the above-mentioned conditional expression (4) is 0.00373, thereby satisfying the above-mentioned conditional expressions (1) to (4), respectively.

The following Table 4 shows the values of $D_{12}$, $D_{21}$, $D_{24}$ in the column of axial surface space D in Table 1 at each of the wide-angle end and telephoto end.

Example 2

Figures 2A, 2B:
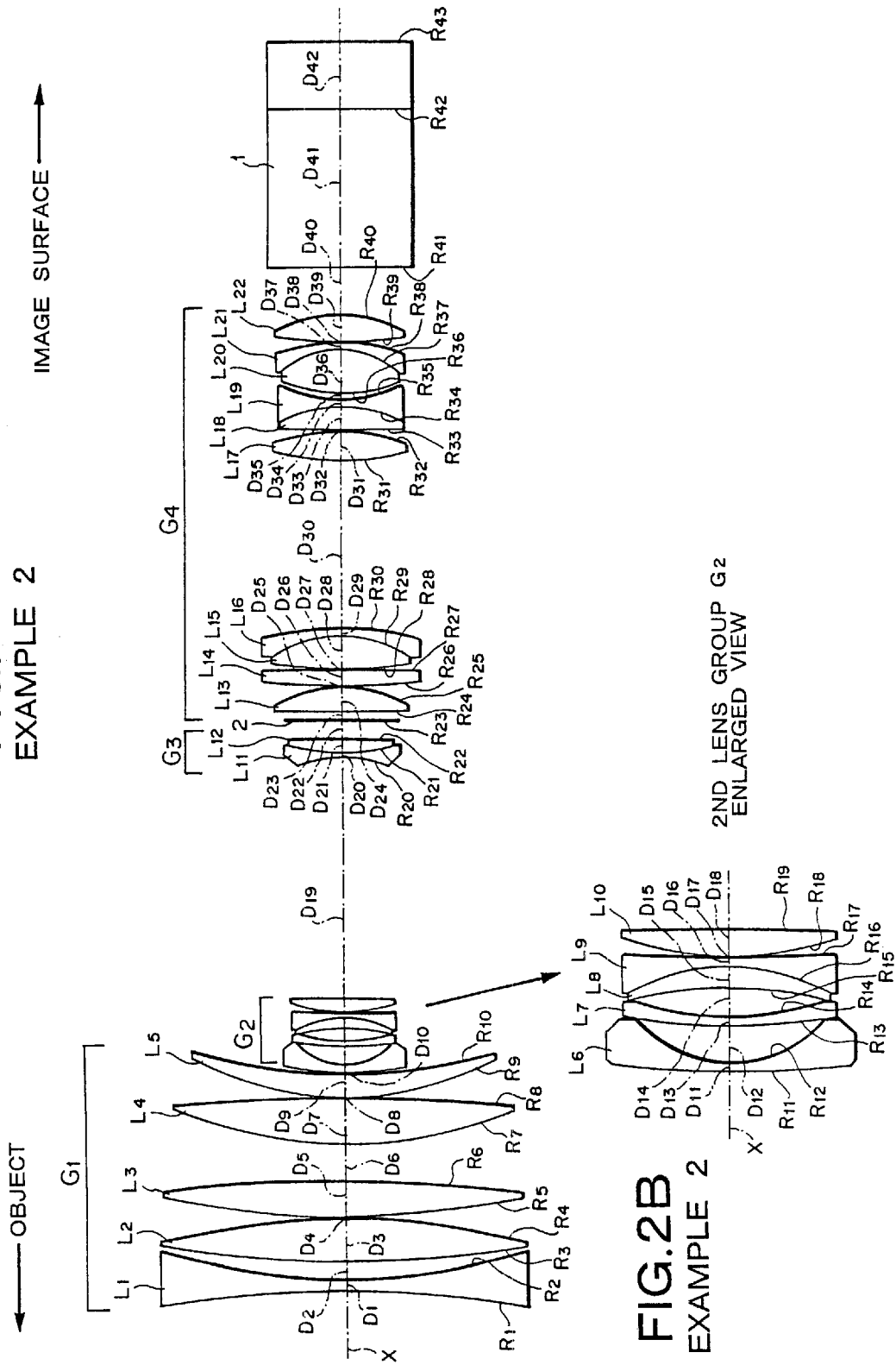
FIGS. 2A and 2B are schematic views showing a basic configuration of the zoom lens in accordance with Example 2 of the present invention.
Figure 13:
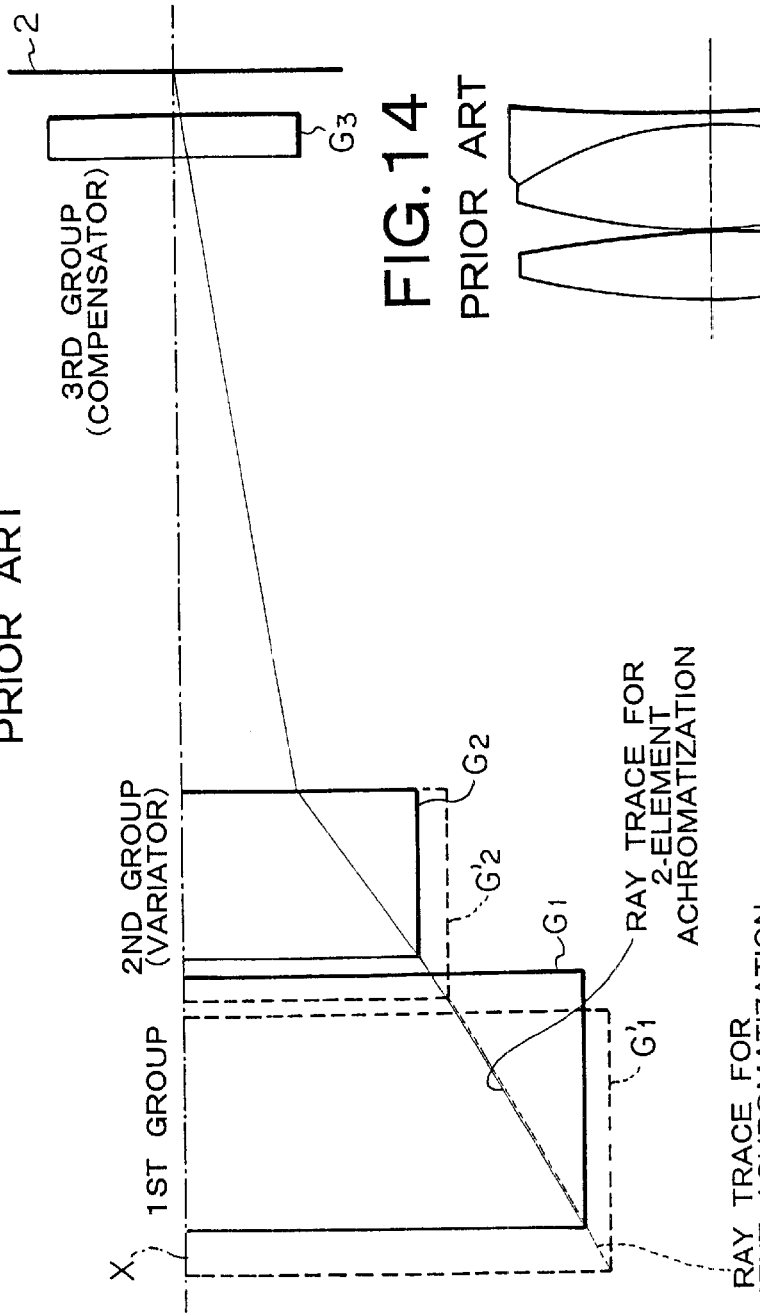
FIG. 13 is a schematic view for explaining a problem of the prior art.
Figure 14:
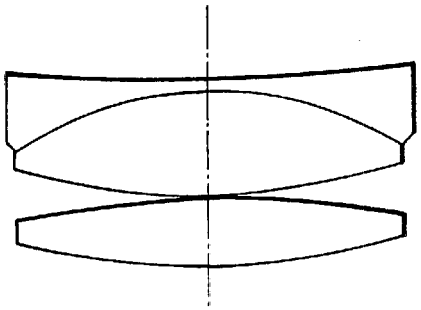
FIG. 14 is a schematic view for explaining the prior art.

FIGS. 2A and 2B show the zoom lens in accordance with Example 2 of the present invention, illustrating the individual lens configurations at its wide-angle end.

As shown in FIG. 2A, the zoom lens of Example 2 has the same configuration as the zoom lens of Example 1 except that the first-b lens group $G_{1b}$ in the first lens group $G_1$ is constituted by two lenses $L_4$ and $L_5$, and that the fourth lens group $G_4$ is constituted by the stop 2 and ten lenses $L_{13}$ to $L_{22}$.

The zoom lens is configured so as to satisfy the above-mentioned conditional expressions. FIG. 2B shows the configuration of the second lens group $G_2$, which is a characteristic feature of the lens in accordance with the present invention, in enlarged dimension. This configuration is substantially the same as that of the second lens group $G_2$ of the zoom lens in accordance with Example 1.

Table 2 (follows) shows the values of radius of curvature R (mm) of each lens surface, axial surface space D (mm), refractive index N of each lens at e-line, and Abbe number $v$ of each lens at d-line in the zoom lens in accordance with Example 2. The numbers in the table successively increase from the object side.

The lower part of Table 2 shows the focal length f of the whole system from its wide-angle end to telephoto end, and F number. Further, it shows the zoom ratio.

As shown in the lower part of Table 2, the value of $v_{23}$ in the above-mentioned conditional expression (1) is 22.8, the value of $v_{25}$ in the above-mentioned conditional expression (2) is 23.9, the value Of $f_2/f_{2a}$ in the above-mentioned conditional expression (3) is 0.331, and the value of $|N_{23}-N_{24}|$ in the above-mentioned conditional expression (4) is 0.00373, thereby satisfying the above-mentioned conditional expressions (1) to (4), respectively.

The following Table 4 shows the values of $D_{10}$, $D_{19}$, $D_{22}$ in the column of axial surface space D in Table 2 at each of the wide-angle end and telephoto end.

Comparative Example

FIGS. 3A and 3B show the zoom lens in accordance with Comparative Example, illustrating the individual lens configurations at its wide-angle end.

As shown in FIG. 3A, the zoom lens of Comparative Example differs from the zoom lens of Example 2 greatly in the configuration of the second lens group $G_2$.

FIG. 3B shows the configuration of the second lens group $G_2$, in enlarged dimension, illustrating that the second lens group $G_2$ of Comparative Example is constituted by four lenses $L_6$ to $L_9$. In particular, an achromatic function (counter achromatization) is obtained by the biconvex lens $L_8$ and the biconcave lens $L_9$, which are two lenses on the image surface side.

Table 3 (follows) shows the values of radius of curvature R (mm) of each lens surface, axial surface space D (mm), refractive index N of each lens at e-line, and Abbe number ν of each lens at d-line in the zoom lens in accordance Comparative Example. The numbers in the table successively increase from the object side.

The lower part of Table 3 shows the focal length f of the whole system from its wide-angle end to telephoto end, and F number. Further, it shows the zoom ratio.

The following Table 4 shows the values of $D_9$, $D_{17}$, $D_{20}$ in the column of axial surface space D in Table 3 at each of the wide-angle end and telephoto end.

FIGS. 4A to 4D, 7A to 7D, and 10A to 10D are aberration charts showing various kinds of aberration (spherical aberration, astigmatism, distortion, and lateral chromatic aberration) of the zoom lenses in accordance with the above-mentioned Examples and Comparative Examples at their wide-angle ends (object distance=3 m); FIGS. 5A to 5D, 8A to 8D, and 11A to 11D are aberration charts showing various kinds of aberration (spherical aberration, astigmatism, distortion, and lateral chromatic aberration) of the zoom lenses in accordance with the above-mentioned Examples and Comparative examples at their telephoto ends (object distance=3 m); and FIGS. 6A to 6D, 9A to 9D, and 12A to 12D are aberration charts showing various kinds of aberration (spherical aberration, astigmatism, distortion, and lateral chromatic aberration) of the zoom lenses in accordance with the above-mentioned Examples and Comparative examples at their telephoto ends (object distance=12 m). Each spherical aberration chart shows aberration at each of 615 nm, 546.1 nm, and 460 nm; whereas each astigmatism chart shows aberration with respect to sagittal and tangential image surfaces.

As can be seen from these aberration charts, the zoom lens in accordance with each of the above-mentioned Examples can correct various kinds of aberration favorably.

As can be seen when compared with Comparative Example, the above-mentioned Examples can enhance the freedom of design by increasing the number of lens surfaces of a lens system having an achromatic function (counter achromatization) without increasing the total thickness thereof.

The zoom lens of the present invention is not restricted to those of the above-mentioned Examples. For instance, the form and number of lenses constituting each lens group may be selected as appropriate.

The achromatic lens of the present invention is applicable not only to the above-mentioned zoom lens, but also to various kinds of optical apparatus such as binoculars and monoculars, for example.

As explained in the foregoing, the achromatic lens in accordance with the present invention can secure a freedom of lens design by attaining a greater number of lens surfaces in a lens system having an achromatic function and also making their lens thickness smaller as compared with a conventional three-element lens having an achromatic (counter achromatizing) function.

The zoom lens of the present invention can secure a freedom of lens design by mounting the achromatic lens to a variator and satisfying predetermined conditional expressions, can attain compactness and lightness by decreasing the effective diameter of the first lens group, and can yield an excellent achromatic effect.

TABLE 1

| Surface | R | D | Ne | νd |
|---|---|---|---|---|
| 1 | −162.571 | 1.850 | 1.81183 | 33.3 |
| 2 | 172.619 | 4.280 | | |
| 3 | 323.228 | 7.860 | 1.43496 | 95.2 |
| 4 | −168.070 | 0.120 | | |
| 5 | 189.767 | 7.800 | 1.43496 | 95.2 |
| 6 | −246.915 | 6.337 | | |
| 7 | 147.988 | 7.270 | 1.43496 | 95.2 |
| 8 | −389.063 | 0.120 | | |
| 9 | 104.439 | 7.430 | 1.43496 | 95.2 |
| 10 | −1271.953 | 0.120 | | |
| 11 | 68.189 | 4.260 | 1.82016 | 46.6 |
| 12 | 108.928 | 0.920*1 | | |
| 13 | 60.872 | 0.850 | 1.88814 | 40.8 |
| 14 | 12.901 | 4.530 | | |
| 15 | 63.272 | 1.000 | 1.82016 | 46.6 |
| 16 | 49.491 | 2.660 | | |
| 17 | −35.974 | 2.100 | 1.81643 | 22.8 |
| 18 | −21.281 | 1.000 | 1.82016 | 46.6 |
| 19 | 74.041 | 0.120 | | |
| 20 | 31.367 | 2.920 | 1.85501 | 23.9 |
| 21 | 1920.312 | 55.826*2 | | |
| 22 | −28.332 | 0.800 | 1.8081 | 46.6 |
| 23 | 36.233 | 2.660 | 1.85501 | 23.9 |
| 24 | −450.729 | 5.903*3 | | |
| 25 | (stop) | 2.300 | | |
| 26 | −300.916 | 4.700 | 1.64128 | 55.4 |
| 27 | −27.483 | 3.100 | | |
| 28 | 50.925 | 6.800 | 1.48914 | 70.4 |
| 29 | −25.841 | 1.300 | 1.83945 | 42.7 |
| 30 | −113.431 | 33.430 | | |
| 31 | 36.472 | 7.590 | 1.51872 | 64.2 |
| 32 | −52.587 | 2.490 | | |
| 33 | 747.706 | 4.360 | 1.48914 | 70.4 |
| 34 | −56.558 | 1.300 | 1.83945 | 42.7 |
| 35 | 23.203 | 1.970 | | |
| 36 | 24.642 | 8.890 | 1.48914 | 70.4 |
| 37 | −18.865 | 1.300 | 1.83945 | 42.7 |
| 38 | −36.698 | 0.200 | | |
| 39 | 91.697 | 3.210 | 1.51872 | 64.2 |
| 40 | −97.102 | 10.390 | | |
| 41 | ∞ | 33.000 | 1.61170 | 46.4 |
| 42 | ∞ | 13.200 | 1.51825 | 64.1 |
| 43 | ∞ | | | |

*variable

| | |
|---|---|
| focal length | 8.502~170.043 |
| Fno. | 2.23~2.75 |
| zoom ratio | 20x |
| ν23 | 22.8 |
| ν25 | 23.9 |
| f2 | −15.158 |
| f2a | −29.085 |
| f2/f2a | 0.521 |
| N23–N24 | −0.00373 |

TABLE 2

| Surface | R | D | Ne | νd |
|---|---|---|---|---|
| 1 | −215.586 | 2.250 | 1.81264 | 25.4 |
| 2 | 127.078 | 3.570 | | |
| 3 | 213.994 | 9.430 | 1.43496 | 95.2 |
| 4 | −145.576 | 0.120 | | |
| 5 | 173.914 | 7.230 | 1.43496 | 95.2 |
| 6 | −318.759 | 7.870 | | |
| 7 | 93.933 | 9.210 | 1.62032 | 63.4 |
| 8 | −462.817 | 0.120 | | |
| 9 | 64.732 | 4.810 | 1.88814 | 40.8 |
| 10 | 115.846 | 0.920*1 | | |

TABLE 2-continued

| Surface | R | D | Ne | vd |
|---|---|---|---|---|
| 11 | 106.468 | 0.850 | 1.88814 | 40.8 |
| 12 | 13.262 | 3.874 | | |
| 13 | 62.563 | 0.800 | 1.88814 | 40.8 |
| 14 | 29.323 | 3.097 | | |
| 15 | -41.139 | 2.280 | 1.81643 | 22.8 |
| 16 | -21.090 | 1.000 | 1.82016 | 48.5 |
| 17 | 247.926 | 0.120 | | |
| 18 | 33.702 | 2.730 | 1.85501 | 23.9 |
| 19 | ∞ | 50.240*2 | | |
| 20 | -28.173 | 0.800 | 1.80810 | 46.6 |
| 21 | 36.233 | 2.840 | 1.85501 | 23.9 |
| 22 | -351.466 | 3.964*3 | | |
| 23 | (stop) | 1.820 | | |
| 24 | ∞ | 5.020 | 1.58565 | 46.5 |
| 25 | -29.692 | 0.150 | | |
| 26 | 159.310 | 3.390 | 1.59143 | 61.2 |
| 27 | -2167.100 | 0.120 | | |
| 28 | 114.237 | 6.950 | 1.51872 | 64.2 |
| 29 | -25.841 | 1.250 | 1.83931 | 37.2 |
| 30 | -68.431 | 34.900 | | |
| 31 | 46.985 | 6.390 | 1.51872 | 64.2 |
| 32 | -39.828 | 0.120 | | |
| 33 | -1128.211 | 4.840 | 1.48914 | 70.4 |
| 34 | -26.754 | 1.300 | 1.83945 | 42.7 |
| 35 | 27.903 | 1.250 | | |
| 36 | 33.776 | 8.710 | 1.48914 | 70.4 |
| 37 | -17.787 | 1.250 | 1.83945 | 42.7 |
| 38 | -39.983 | 0.120 | | |
| 39 | 85.513 | 5.420 | 1.52033 | 59.0 |
| 40 | -30.988 | 10.331 | | |
| 41 | ∞ | 33.000 | 1.61170 | 46.4 |
| 42 | ∞ | 13.200 | 1.51825 | 64.1 |
| 43 | ∞ | | | |

*variable
| | | |
|---|---|---|
| focal length | 8.002~428.032 | |
| Fno. | 1.82~2.16 | |
| zoom ratio | 16x | |
| ν23 | 22.8 | |
| ν25 | 23.9 | |
| f2 | -14.1 | |
| f2a | -42.637 | |
| f2/f2a | 0.331 | |
| N23-N24 | -0.00373 | |

TABLE 3

| Surface | R | D | Ne | vd |
|---|---|---|---|---|
| 1 | -333.030 | 2.400 | 1.81264 | 25.4 |
| 2 | 114.170 | 11.452 | 1.49845 | 81.6 |
| 3 | -200.031 | 0.120 | | |
| 4 | 169.143 | 6.041 | 1.48915 | 70.2 |
| 5 | -900.354 | 7.199 | | |
| 6 | 107.310 | 6.151 | 1.64128 | 55.4 |
| 7 | 726.623 | 0.120 | | |
| 8 | 68.649 | 5.852 | 1.80401 | 42.2 |
| 9 | 166.760 | 0.920*1 | | |
| 10 | 79.506 | 0.820 | 1.83931 | 37.2 |
| 11 | 14.848 | 5.371 | | |
| 12 | -54.474 | 0.820 | 1.79195 | 47.4 |
| 13 | 31.142 | 2.462 | | |
| 14 | 26.100 | 4.937 | 1.85504 | 23.8 |
| 15 | -34.829 | 0.393 | | |
| 16 | -28.116 | 0.820 | 1.83945 | 42.7 |
| 17 | 79.315 | 54.237*2 | | |
| 18 | -29.148 | 0.820 | 1.79195 | 47.4 |
| 19 | 44.223 | 2.861 | 1.85504 | 23.8 |
| 20 | -356.936 | 4.002*3 | | |
| 21 | (stop) | 1.610 | | |
| 22 | 217.866 | 5.000 | 1.58565 | 46.5 |
| 23 | -31.664 | 0.120 | | |
| 24 | 166.920 | 3.400 | 1.59143 | 61.2 |
| 25 | -851.160 | 0.120 | | |

TABLE 3-continued

| Surface | R | D | Ne | vd |
|---|---|---|---|---|
| 26 | 49.395 | 7.100 | 1.48915 | 70.2 |
| 27 | -30.778 | 1.250 | 1.83931 | 37.2 |
| 28 | -548.294 | 34.000 | | |
| 29 | 41.052 | 6.100 | 1.51978 | 52.2 |
| 30 | -54.994 | 0.120 | | |
| 31 | 57.503 | 5.400 | 1.48915 | 70.2 |
| 32 | -38.117 | 1.300 | 1.83945 | 42.7 |
| 33 | 21.000 | 2.160 | | |
| 34 | 27.027 | 9.600 | 1.52033 | 59.0 |
| 35 | -20.690 | 1.250 | 1.83945 | 42.7 |
| 36 | -97.081 | 0.200 | | |
| 37 | 62.616 | 6.270 | 1.48915 | 70.2 |
| 38 | -28.477 | 10.494 | | |
| 39 | ∞ | 33.000 | 1.58565 | 46.5 |
| 40 | ∞ | 13.200 | 1.51825 | 64.1 |
| 41 | ∞ | | | |

*variable
| | |
|---|---|
| focal length | 8.998~161.964 |
| Fno. | 1.85~2.59 |
| zoom ratio | 18x |

TABLE 4

| | wide-angle end | telephoto end |
|---|---|---|
| Example 1 | | |
| *1 (D$_{12}$) | 0.920 | 56.198 |
| *2 (D$_{21}$) | 55.826 | 5.181 |
| *3 (D$_{24}$) | 5.903 | 1.270 |
| Example 2 | | |
| *1 (D$_{10}$) | 0.920 | 49.541 |
| *2 (D$_{19}$) | 50.240 | 3.943 |
| *3 (D$_{22}$) | 3.964 | 1.640 |
| Comparative Example | | |
| *1 (D$_9$) | 0.920 | 51.751 |
| *2 (D$_{17}$) | 54.237 | 5.825 |
| *3 (D$_{20}$) | 4.002 | 1.583 |

What is claimed is:

1. A zoom lens comprising, successively from an object side, a first lens group, fixed upon zooming, having a positive refracting power; a second lens group, movable upon zooming, having a negative refracting power; a third lens group, having a negative refracting power, for correcting a fluctuation of an image surface upon zooming; and a fourth lens group, fixed upon zooming, having a positive refracting power;

wherein said second lens group comprises, successively from the object side, two meniscus lenses each having a negative refracting power with a convex surface directed onto the object side; and an achromatic lens comprising, successively from the object side, a cemented lens having a negative refracting power as a whole, and a lens having a positive refracting power with a convex surface directed onto the object side; said cemented lens comprising, successively from the object side, a meniscus lens or plane-convex lens having a positive refracting power with a concave surface or plane directed onto the object side, and a lens having a negative refracting power.

2. A zoom lens according to claim 1, wherein said first lens group comprises, successively from the object side, a first-a lens group, fixed upon a focusing operation, having a positive refracting power; and a first-b lens group, movable to the object side upon a focusing operation from an object at infinity into an object at a shorter distance, having a positive refracting power.

3. A zoom lens according to claim 1, wherein said zoom lens satisfies both of the following conditional expressions (1) and (2):

$$\nu_{23} < 25.0 \tag{1}$$

$$\nu_{25} < 25.0 \tag{2}$$

where $\nu_{23}$ is the Abbe number $\nu_d$ of the lens having a positive refracting power constituting the cemented lens in the second lens group; and $\nu_{25}$ is the Abbe number $\nu_d$ of the lens having a positive refracting power with a convex surface directed onto the object side constituting the cemented lens in the second lens group.

4. A zoom lens according to claim 3, wherein said zoom lens satisfies the following conditional expression (3):

$$0.30 < f_2/f_{2a} < 0.60 \tag{3}$$

where $f_2$ is the focal length of the second lens group; and $f_{2a}$ is the focal length of the cemented lens in the second lens group.

5. A zoom lens according to claim 3, wherein said zoom lens satisfies the following conditional expression (4):

$$|N_{23} - N_{24}| < 0.02 \tag{4}$$

where $N_{23}$ is the refractive index $N_e$ of the lens having a positive refracting power constituting the cemented lens in the second lens group; and $N_{24}$ is the refractive index $N_e$ of the lens having a negative refracting power constituting the cemented lens in the second lens group.

* * * * *

UNITED STATES PATENT AND TRADEMARK OFFICE
CERTIFICATE OF CORRECTION

PATENT NO. : 6,490,096 B2
DATED : December 3, 2002
INVENTOR(S) : Hitoshi Miyano

It is certified that error appears in the above-identified patent and that said Letters Patent is hereby corrected as shown below:

Column 9,
Lines 1-32, delete Table 2 and substitute therefore

TABLE 2 –continued

| Surface | R | D | Ne | vd |
|---|---|---|---|---|
| 11 | 106.468 | 0.850 | 1.88814 | 40.8 |
| 12 | 13.262 | 3.874 | | |
| 13 | 62.563 | 0.800 | 1.88814 | 40.8 |
| 14 | 29.323 | 3.097 | | |
| 15 | -41.139 | 2.280 | 1.81643 | 22.8 |
| 16 | -21.090 | 1.000 | 1.82016 | 48.5 |
| 17 | 247.926 | 0.120 | | |
| 18 | 33.702 | 2.730 | 1.85501 | 23.9 |
| 19 | ∞ | 50.240*2 | | |
| 20 | -28.173 | 0.800 | 1.80810 | 46.6 |
| 21 | 36.233 | 2.840 | 1.85501 | 23.9 |
| 22 | -351.466 | 3.964*3 | | |
| 23 | (stop) | 1.820 | | |
| 24 | ∞ | 5.020 | 1.58565 | 46.5 |
| 25 | -29.692 | 0.150 | | |
| 26 | 159.310 | 3.390 | 1.59143 | 61.2 |
| 27 | -2167.100 | 0.120 | | |
| 28 | 114.237 | 6.950 | 1.51872 | 64.2 |
| 29 | -25.841 | 1.250 | 1.83931 | 37.2 |
| 30 | -68.431 | 34.900 | | |
| 31 | 46.985 | 6.390 | 1.51872 | 64.2 |
| 32 | -39.828 | 0.120 | | |
| 33 | -1128.211 | 4.840 | 1.48914 | 70.4 |
| 34 | -26.754 | 1.300 | 1.83945 | 42.7 |
| 35 | 27.903 | 1.250 | | |
| 36 | 33.776 | 8.710 | 1.48914 | 70.4 |
| 37 | -17.787 | 1.250 | 1.83945 | 42.7 |
| 38 | -39.983 | 0.120 | | |
| 39 | 85.513 | 5.420 | 1.52033 | 59.0 |
| 40 | -30.988 | 10.331 | | |
| 41 | ∞ | 33.000 | 1.61170 | 46.4 |
| 42 | ∞ | 13.200 | 1.51825 | 64.1 |
| 43 | ∞ | | | |

* variable

UNITED STATES PATENT AND TRADEMARK OFFICE
CERTIFICATE OF CORRECTION

PATENT NO. : 6,490,096 B2
DATED : December 3, 2002
INVENTOR(S) : Hitoshi Miyano

It is certified that error appears in the above-identified patent and that said Letters Patent is hereby corrected as shown below:

Column 9 cont'd,
Line 33, delete "8.002~428.032" and substitute therefore -- 8.002~128.032 --

Signed and Sealed this

Twentieth Day of May, 2003

JAMES E. ROGAN
*Director of the United States Patent and Trademark Office*